US010196986B2

(12) United States Patent
Fang et al.

(10) Patent No.: US 10,196,986 B2
(45) Date of Patent: Feb. 5, 2019

(54) HYDRODYNAMIC SEALS IN BEARING COMPARTMENTS OF GAS TURBINE ENGINES

(71) Applicant: General Electric Company, Schenectady, NY (US)

(72) Inventors: Ning Fang, Mason, OH (US); Scott Wolfer, Cincinnati, OH (US); Adam Mitchell Record, Liberty Township, OH (US); Jonathan K. Remer, Saugus, MA (US); Daryl Scott Schneider, Cincinnati, OH (US); Jacob Patrick Miller, Blue Ash, OH (US); Kyle Robert Snow, Loveland, OH (US)

(73) Assignee: General Electric Company, Schenectady, NY (US)

( * ) Notice: Subject to any disclaimer, the term of this patent is extended or adjusted under 35 U.S.C. 154(b) by 592 days.

(21) Appl. No.: 14/845,625

(22) Filed: Sep. 4, 2015

(65) Prior Publication Data

US 2017/0067397 A1    Mar. 9, 2017

(51) Int. Cl.
*F02C 7/28* (2006.01)
*F01D 11/02* (2006.01)
(Continued)

(52) U.S. Cl.
CPC .............. *F02C 7/28* (2013.01); *F01D 11/02* (2013.01); *F01D 25/16* (2013.01); *F01D 25/183* (2013.01); *F02C 3/04* (2013.01); *F02C 7/06* (2013.01); *F16C 33/664* (2013.01); *F16C 33/805* (2013.01); *F16J 15/162* (2013.01);
(Continued)

(58) Field of Classification Search
CPC ...... F02C 7/06; F02C 7/28; F02C 3/04; F01D 25/16; F01D 25/18; F01D 25/183; F01D 25/186; F01D 11/04
See application file for complete search history.

(56) References Cited

U.S. PATENT DOCUMENTS 2,681,837 A    6/1954  Boyd et al.
3,133,693 A    5/1964  Holl
(Continued)

FOREIGN PATENT DOCUMENTS

EP    2 789 806 B1    6/2017
JP    2005-325837 A    11/2005
(Continued)

OTHER PUBLICATIONS

Extended European Search Report and Opinion issued in connection with corresponding EP Application No. 16177626.5 dated Jan. 23, 2017.
(Continued)

*Primary Examiner* — Craig Kim
(74) *Attorney, Agent, or Firm* — General Electric Company; Pamela Kachur (57) ABSTRACT

In one aspect, the present disclosure is directed to a bearing compartment sealing system including a bearing for supporting a shaft. A housing encloses the bearing and defines a compartment for holding lubricant therein. At least two seals are located between the shaft and the housing. The at least two seals, the housing, and the shaft collectively enclose the compartment. Only one of the at least two seals is a hydrodynamic seal.

10 Claims, 5 Drawing Sheets

(51) Int. Cl.
*F01D 25/16* (2006.01)
*F01D 25/18* (2006.01)
*F16J 15/3244* (2016.01)
*F02C 3/04* (2006.01)
*F02C 7/06* (2006.01)
*F16C 33/66* (2006.01)
*F16C 33/80* (2006.01)
*F16J 15/16* (2006.01)
*F16J 15/40* (2006.01)
*F16J 15/447* (2006.01)

(52) U.S. Cl.
CPC ......... *F16J 15/3244* (2013.01); *F16J 15/406* (2013.01); *F16J 15/4472* (2013.01); *F05D 2220/32* (2013.01); *F05D 2240/50* (2013.01); *F05D 2240/55* (2013.01); *F05D 2260/40311* (2013.01); *F05D 2260/98* (2013.01); *F16C 2360/23* (2013.01); *Y02T 50/671* (2013.01)

(56) References Cited

U.S. PATENT DOCUMENTS

| | | | |
|---|---|---|---|
| 3,527,054 A | | 9/1970 | Hemsworth |
| 3,844,110 A | * | 10/1974 | Widlansky ............... F02C 7/06 60/39.08 |
| 4,578,018 A | | 3/1986 | Pope |
| 5,593,165 A | | 1/1997 | Murray et al. |
| 6,330,790 B1 | | 12/2001 | Arora et al. |
| 8,641,366 B1 | | 2/2014 | Ullah et al. |
| 8,770,918 B1 | | 7/2014 | Ullah et al. |
| 2013/0106061 A1 | * | 5/2013 | Ruggiero ................ F01D 11/02 277/411 |
| 2014/0090355 A1 | * | 4/2014 | James ...................... F02C 7/06 60/39.08 |
| 2014/0124297 A1 | * | 5/2014 | Motto .................... F01D 25/20 184/6.12 |
| 2014/0255156 A1 | | 9/2014 | Ullah et al. |

FOREIGN PATENT DOCUMENTS

| | | |
|---|---|---|
| JP | 2009-002329 A | 1/2009 |
| JP | 2012-503133 A | 2/2012 |
| JP | 2015-503045 A | 1/2015 |
| WO | 2014/088608 A1 | 6/2014 |

OTHER PUBLICATIONS

Machine translation and Notification of Reasons for Refusal issued in connection with corresponding JP Application No. 2016-124032 dated Jul. 4, 2017.

* cited by examiner

FIG. 5

HYDRODYNAMIC SEALS IN BEARING COMPARTMENTS OF GAS TURBINE ENGINES

FEDERALLY SPONSORED RESEARCH

This invention was made with government support under contract number FA8650-07-C-2802 of the Department of the Air Force. The government may have certain rights in the invention.

FIELD OF THE INVENTION

The present subject matter relates generally to a gas turbine engine and, more particularly, to a bearing compartment sealing system in a gas turbine engine.

BACKGROUND OF THE INVENTION

Gas turbine engines typically include a rotor assembly, a compressor, and a turbine. The rotor assembly includes a fan having an array of fan blades extending radially outwardly from a rotor shaft. The rotor shaft, which transfers power and rotary motion from the turbine to both the compressor and the fan, is supported longitudinally using a plurality of bearing assemblies. Known bearing assemblies include one or more rolling elements supported within a paired race. To maintain a rotor critical speed margin, the rotor assembly is typically supported on three bearing assemblies: one thrust bearing assembly and two roller bearing assemblies. The thrust bearing assembly supports the rotor shaft and minimizes axial and radial movement thereof, while the roller bearing assemblies support radial movement of the rotor shaft.

Typically, these bearing assemblies are enclosed within a housing disposed radially around the bearing assembly. The housing forms a compartment or sump that holds a lubricant (e.g., oil) for lubricating the bearing. This lubricant may also be lubricant gears and other seals. Gaps between the housing and the rotor shaft are necessary to permit rotation of the rotor shaft relative to the housing. The bearing sealing system usually includes two such gaps: one on the upstream end and another on the downstream end. In this respect, a seal disposed in each gap prevents the lubricant from escaping the compartment. Known seals include labyrinth or knife-edge seals and carbon seals.

However, the carbon seals may directly contact the moving rotor shaft, which may reduce the wear life of the seals and require dedicated cooling thereof. In this respect, many gas turbines now use hydrodynamic seals, which do not contact the rotating rotor shaft at high speed. Specifically, hydrodynamic carbon seals draw air through the seal and into the compartment, thereby maintaining a gap between the moving components and the stationary components. The pressure of air drawn into the compartment prevents the lubricant from escaping. Nevertheless, the use of two hydrodynamic seals instead of contact seals increases the size, weight, cost, and installation complexity of the bearing compartment sealing system.

Accordingly, a bearing compartment sealing system for a gas turbine engine that can provide improved wear life, reduce the volume of air drawn into the compartment during operation, and eliminate the need for dedicated seal cooling would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present disclosure is directed to a bearing compartment sealing system including a bearing for supporting a shaft. A housing encloses the bearing and defines a compartment for holding lubricant therein. At least two seals are located between the shaft and the housing. The at least two seals, the housing, and the shaft collectively enclose the compartment. Only one of the at least two seals is a hydrodynamic seal.

Another aspect of the present disclosure is directed to a gas turbine engine. The gas turbine engine includes a compressor, a combustor, a turbine, and a shaft rotatably coupling the compressor and the turbine. A bearing is positioned between the shaft and one of the compressor or the turbine. A housing encloses the bearing and defines a compartment for holding lubricant therein. At least one pump for recirculating lubricant between the compartment and a remote lubricant reservoir. At least two seals are located between the shaft and the housing. The at least two seals, the housing, and the shaft collectively enclose the compartment. Only one of the at least two seals is a hydrodynamic seal.

A further aspect of the present disclosure includes a method for sealing a bearing compartment in a gas turbine engine. The method includes at least partially supporting a shaft having a longitudinal axis with at least one bearing. The shaft is rotated about the longitudinal axis. Each of the at least one bearing is at least partially enclosed with a housing that defines a compartment for holding lubricant for lubricating the at least one bearing. A first pressure is created on an outer side of a hydrodynamic seal and an outer side of a labyrinth seal. A second pressure is created on an inner side of the hydrodynamic seal and an inner side of the labyrinth seal. The first pressure is relatively greater than the second pressure, thereby drawing air through the hydrodynamic seal into the compartment.

These and other features, aspects and advantages of the present invention will be better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

An improved bearing compartment sealing system is generally provided for a gas turbine engine. Specifically, in several embodiments, the sealing system may include a housing that at least partially encloses a bearing supporting a shaft. The housing defines a compartment for holding lubricant for lubricating the bearing. The sealing system further includes a hydrodynamic carbon seal and a labyrinth seal for sealing between the housing and the shaft. The outer surfaces of the hydrodynamic and labyrinth seals experience a first pressure. The inner surfaces of the hydrodynamic and labyrinth seals experience a second pressure. The first pressure is relatively greater than the second, thereby preventing the lubricant from escaping the compartment.

Additionally, as will be described below, the sealing system may include a de-aerating system for de-aerating and recirculating the lubricant in the compartment. For example, a scavenge pump may pump lubricant from the compartment through to a lubricant cooler to a lubricant reservoir. A de-aerator may remove air entrained in the lubricant. A fresh lubricant pump may then pump fresh lubricant from the lubricant reservoir to the compartment to further bearing lubrication.

Figure 1:
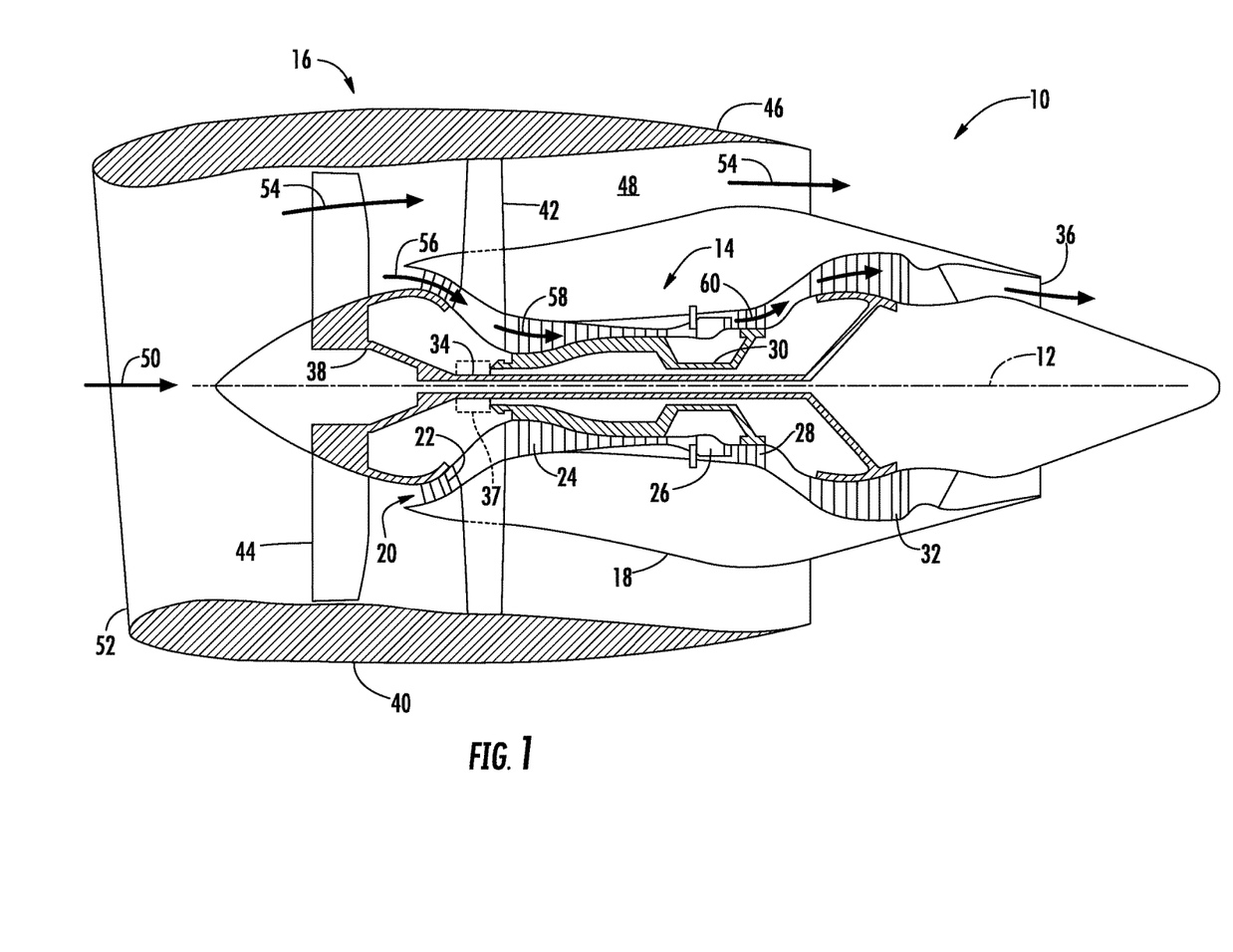
FIG. 1 is a cross-sectional view of one embodiment of a gas turbine engine that may be utilized within an aircraft in accordance with aspects of the present subject matter.

Referring now to the drawings, FIG. 1 illustrates a cross-sectional view of one embodiment of a gas turbine engine 10 that may be utilized within an aircraft in accordance with aspects of the present subject matter, with the engine 10 being shown having a longitudinal or axial centerline axis 12 extending therethrough for reference purposes. In general, the engine 10 may include a core gas turbine engine (indicated generally by reference character 14) and a fan section 16 positioned upstream thereof. The core engine 14 may generally include a substantially tubular outer casing 18 that defines an annular inlet 20. In addition, the outer casing 18 may further enclose and support a booster compressor 22 for increasing the pressure of the air that enters the core engine 14 to a first pressure level. A high pressure, multi-stage, axial-flow compressor 24 may then receive the pressurized air from the booster compressor 22 and further increase the pressure of such air. The pressurized air exiting the high-pressure compressor 24 may then flow to a combustor 26 within which fuel is injected into the flow of pressurized air, with the resulting mixture being combusted within the combustor 26. The high energy combustion products are directed from the combustor 26 along the hot gas path of the engine 10 to a first (high pressure) turbine 28 for driving the high pressure compressor 24 via a first (high pressure) drive shaft 30, and then to a second (low pressure) turbine 32 for driving the booster compressor 22 and fan section 16 via a second (low pressure) drive shaft 34 generally coaxial with first drive shaft 30. After driving each of turbines 28 and 32, the combustion products may be expelled from the core engine 14 via an exhaust nozzle 36 to provide propulsive jet thrust.

Additionally, as shown in FIG. 1, the fan section 16 of the engine 10 may generally include a rotatable, axial-flow fan rotor assembly 38 surrounded by an annular fan casing 40. It should be appreciated by those of ordinary skill in the art that the fan casing 40 may be supported relative to the core engine 14 by a plurality of substantially radially-extending, circumferentially-spaced outlet guide vanes 42. As such, the fan casing 40 may enclose the fan rotor assembly 38 and its corresponding fan rotor blades 44. Moreover, a downstream section 46 of the fan casing 40 may extend over an outer portion of the core engine 14 so as to define a secondary, or by-pass, airflow conduit 48 providing additional propulsive jet thrust.

It should be appreciated that, in several embodiments, the second (low pressure) drive shaft 34 may be directly coupled to the fan rotor assembly 38 to provide a direct-drive configuration. Alternatively, the second drive shaft 34 may be coupled to the fan rotor assembly 38 via a speed reduction device 37 (e.g., a reduction gear or gearbox) to provide an indirect-drive or geared drive configuration. Such a speed reduction device(s) may also be provided between any other suitable shafts and/or spools within the engine as desired or required.

During operation of the engine 10, it should be appreciated that an initial air flow (indicated by arrow 50) may enter the engine 10 through an associated inlet 52 of the fan casing 40. The air flow 50 then passes through the fan blades 44 and splits into a first compressed air flow (indicated by arrow 54) that moves through conduit 48 and a second compressed air flow (indicated by arrow 56) which enters the booster compressor 22. The pressure of the second compressed air flow 56 is then increased and enters the high pressure compressor 24 (as indicated by arrow 58). After mixing with fuel and being combusted within the combustor 26, the combustion products 60 exit the combustor 26 and flow through the first turbine 28. Thereafter, the combustion products 60 flow through the second turbine 32 and exit the exhaust nozzle 36 to provide thrust for the engine 10.

Figure 2:
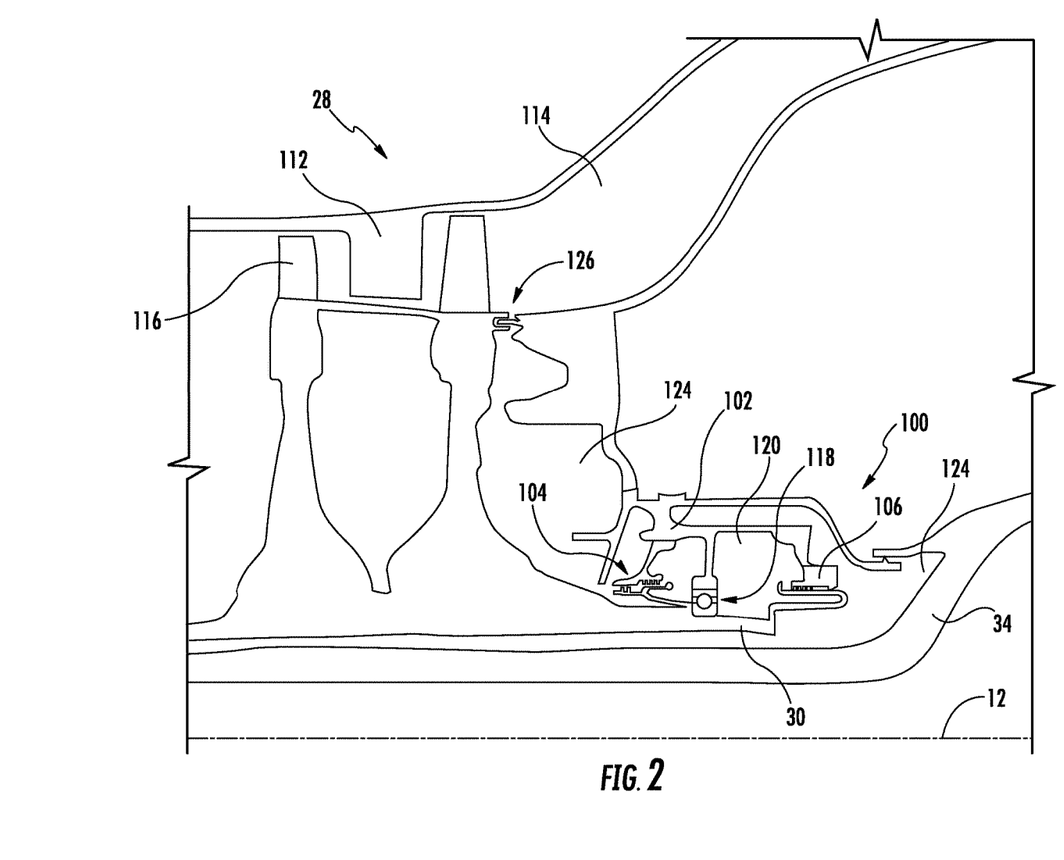
FIG. 2 is a cross-sectional view of one embodiment of a bearing compartment sealing system for sealing a bearing compartment housing relative to a shaft of the gas turbine engine in accordance with aspects of the present subject matter.
Figure 3:
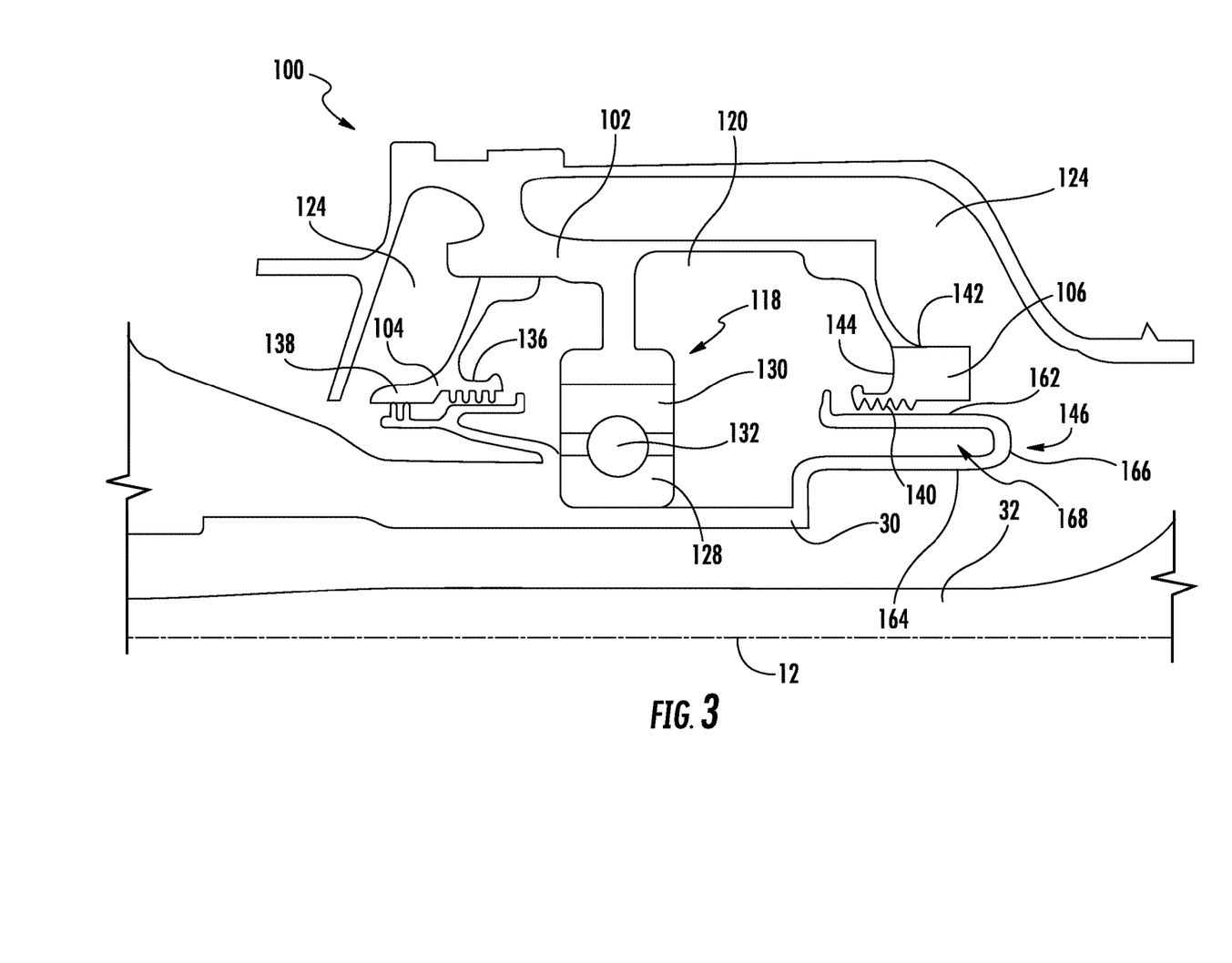
FIG. 3 is a close-up cross-sectional view of the bearing compartment sealing system shown in FIG. 2, particularly illustrating a labyrinth seal and a hydrodynamic carbon seal disposed axially opposite ends of the bearing compartment housing.
Figure 4:
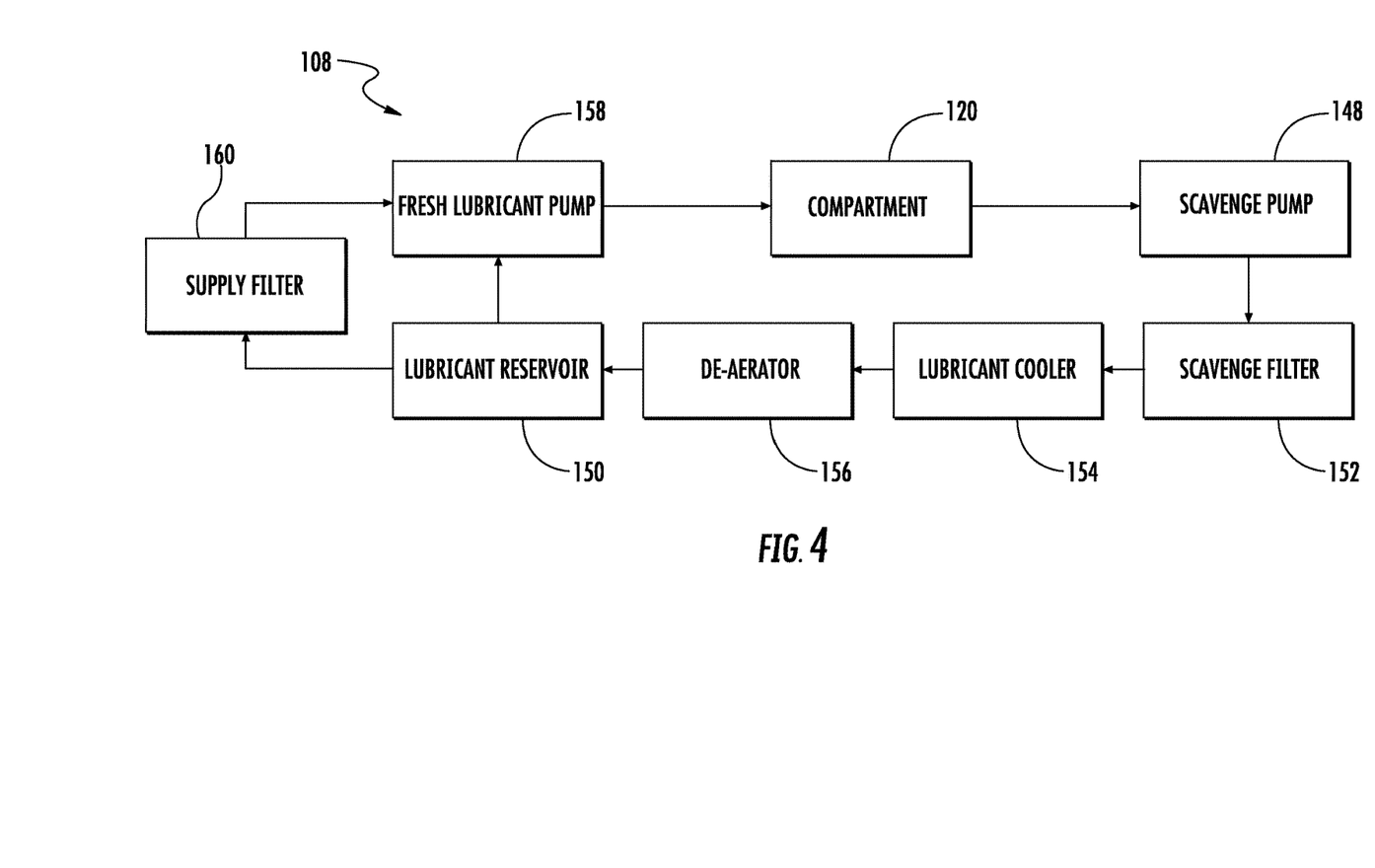
FIG. 4 is a schematic view of a lubricant circulation system for de-aerating lubricant in the gas turbine, and more specifically in the compartment, in accordance with aspects of the present subject matter.
Figure 5:
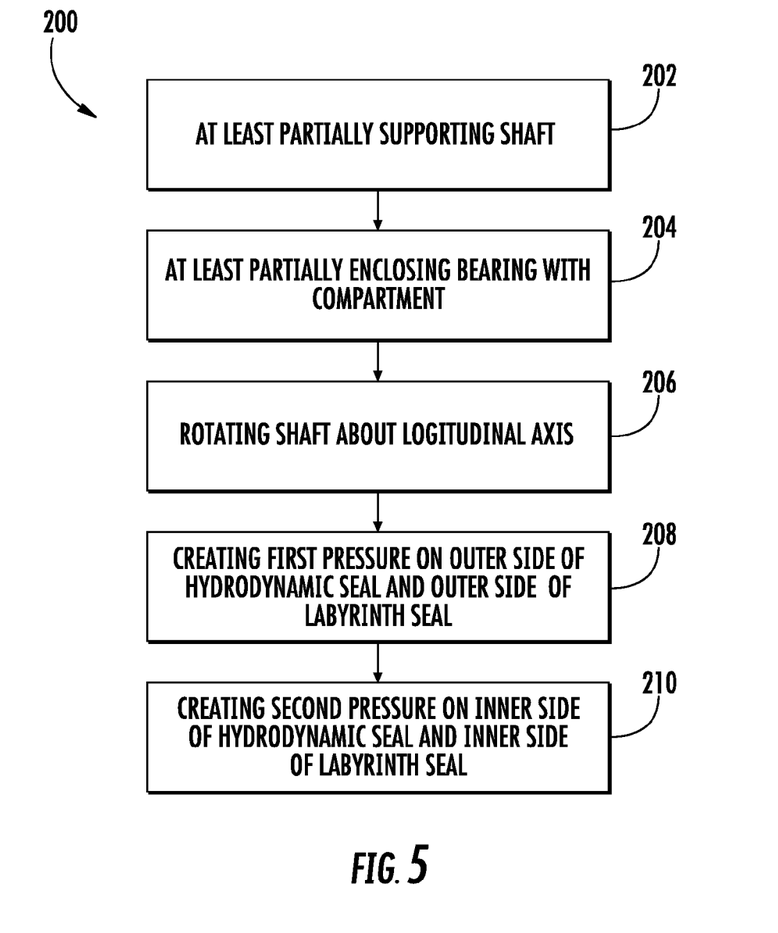
FIG. 5 is a flow chart of a method of using the bearing compartment sealing system in accordance with aspects of the present subject matter.

Referring now to FIGS. 2-4, various views of one embodiment of a bearing compartment sealing system 100 suitable for use within the gas turbine engine 10 are illustrated in accordance with aspects of the present subject matter. Specifically, FIG. 2 is a cross-sectional view of the sealing system 100 for sealing a bearing compartment housing 102 relative to a shaft of the gas turbine engine 10. FIG. 3 is a close-up cross-sectional view of the sealing system 100 shown in FIG. 2, particularly illustrating a labyrinth seal 104 and a hydrodynamic seal 106 disposed at axially opposite ends of the bearing compartment housing 102. Additionally, FIG. 4 is a schematic view of an optional lubricant de-aerating system 108 for de-aerating lubricant from the compartment 102. Furthermore, FIG. 5 is a flow chart of a method 200 of using the sealing system 100 to seal a compartment 120.

As shown in FIG. 2, the sealing system 100 may generally seal between the bearing compartment housing 102 and the high pressure drive shaft 30, which rotates relative thereto. Although, the sealing system 100 may seal between any stationary component and any rotating shaft (e.g., the low pressure drive shaft 34) in the engine 10. The aforementioned relative rotation occurs when one or more stator vanes 112 direct the combustion products 60 flowing through a compressor conduit 114 onto one or more turbine blades 116 coupled to the high pressure drive shaft 30. A bearing assembly 118 supports the high pressure drive shaft 30 relative to various fixed components in the engine 10. The bearing compartment housing 102 at least partially radially encloses the bearing assembly 118, thereby forming a sump or compartment 120 preferably having a radial shape in which the bearing assembly 118 is disposed. Lubricant (e.g., oil) for lubricating the various components of the bearing assembly 118 circulates through the compartment 120. A high pressure cavity 124 is disposed exterior to the bearing compartment housing 102. Preferably, bleed air from the turbine 28 flows through a bleed air port 126 to pressurize the high pressure cavity 124 to a pressure relatively greater than the pressure in the compartment 120.

At least two seals, such as the labyrinth seal 104 and the hydrodynamic seal 106, between the high pressure drive shaft 30 and the bearing compartment housing 102. Although, the at least two seals may be any suitable type of seal as long as one and only one of the seals is the hydrodynamic seal 106. That is, there can be at most one hydrodynamic seal 106 in the sealing system 100. The labyrinth seal 104 and the hydrodynamic seal 106 separate the high pressure cavity 124 and the compartment 120. FIG. 2 illustrates the labyrinth seal 104 disposed upstream of the hydrodynamic seal 106; although, the hydrodynamic seal 106 may be positioned downstream of the labyrinth seal 104 as well.

In this respect, the bearing compartment housing 102, the at least two seals (e.g., the labyrinth seal 104 and the hydrodynamic seal 106), and the high pressure drive shaft 30 collectively enclose the compartment 120. That is, the combination the bearing compartment housing 102, the at least two seals, and the high pressure drive shaft 30 entirely surrounds the compartment 120 axially, radially, and circumferentially. Furthermore, the at least two seals (e.g., the labyrinth seal 104 and the hydrodynamic seal 106) are the only seals that enclose the compartment 120.

In the embodiment illustrated in FIG. 3, the bearing assembly 118 may be a roller bearing. Although, the bearing assembly 118 may be a thrust bearing or any other type of bearing known in the art. More specifically, the bearing assembly 118 includes an inner race 128 extending circumferentially around the outer surface of the high pressure drive shaft 30. An outer race 130 is disposed radially outward from the inner race 128 and mates with the interior surface of the bearing compartment housing 102. The inner and outer races 128, 130 may have a split race configuration. The inner and outer race 128, 130 sandwich at least one rolling element 132 therebetween. Preferably, the inner and outer races 128, 130 sandwich at least three rolling elements 132 therebetween. The rolling elements 132 may generally correspond to any suitable bearing elements, such as balls or rollers.

FIG. 3 also more closely illustrates the labyrinth seal 104 and the hydrodynamic seal 106. Importantly, the labyrinth seal 104 and the hydrodynamic seal 106 are non-contact seals, which require no contact between the stationary and moving components when operating at high speed. Non-contact seals typically have a longer service life than contact seals. But, each type of seal operates in a different manner. The labyrinth seal 104 includes inner surface 136 and an outer surface 138. A tortuous path (not shown) extending between the inner and outer surfaces 136, 138 prevents lubricant from escaping the compartment 102. The air pressure on an outer side 138 of the labyrinth seal 104 (i.e., in the high pressure cavity 124) is greater than the air pressure on the inner side 136 of the labyrinth seal 104 (i.e., in the compartment 120). In this respect, the stationary and rotating components are separated by an air film during relative rotation therebetween.

Nevertheless, the hydrodynamic seal 106 includes one or more grooves 140 separating the stationary and rotating components. The air pressure on an outer side 142 of the hydrodynamic seal 106 (i.e., in the high pressure cavity 124) is greater than the air pressure on the inner side 144 of the hydrodynamic seal 106 (i.e., in the compartment 120). As such, air from the high pressure cavity 124 flows through the grooves 140 into the compartment 120, thereby creating an air film between the stationary and rotating components.

In one embodiment, the hydrodynamic seal 106 is proximate to and in sealing engagement with a hairpin member 146 of the high pressure drive shaft 30. More specifically, the hairpin member 146 includes a radially outer shaft portion 162 radially offset from a radially inner shaft portion 164 by a radial wall 166. In this respect, the radially outer shaft portion 162, the radially inner shaft portion 164, and the radial wall 166 define a cavity 168 therebetween. In one embodiment, the radially outer shaft portion 162 is in sealing engagement with the hydrodynamic seal 106. In this respect, the radially outer shaft portion 162 contacts the hydrodynamic seal 106 when the high pressure drive shaft 30 is stationary or rotating at low speeds. Nevertheless, the hydrodynamic seal 106 lifts off of the radially outer shaft portion 162 when the high pressure drive shaft 30 rotates at high speeds.

The hairpin member 146 may also improve the performance of the gas turbine engine 10. More specifically, lubricant from the compartment 120 is able to contact and cool the radially inner side of the radially outer shaft portion 162 of the hairpin member 146. This, in turn, cools the radially outer side of the radially outer shaft portion 162, which is in contact with the hydrodynamic seal 106 at low speeds and proximate to the hydrodynamic seal 106 at high speeds. That is, heat from the radially outer side conducts through the radially outer shaft portion 162 to the radially inner side thereof, which is cooled by lubricant. This keeps the hydrodynamic seal 106 cooler, which, in turn, permits the gas turbine engine 10 to run hotter and faster, thereby improving the performance thereof.

Importantly, the pressure on the outer side 138 of the labyrinth seal 104 and the outer side 142 of the hydrodynamic seal 106 should be substantially the same. That is, the air pressure in the high pressure cavity 124 should be substantially the same throughout to prevent the creation of air flow currents. These air currents could direct air away from the hydrodynamic seal 106.

FIG. 4 is a schematic view of one embodiment of the optional lubricant circulation system 108. As mentioned above, the air flows through the labyrinth seal 104 and the hydrodynamic seal 106 into the compartment 120. As such, this air and the heat associated therewith should be removed to maintain proper lubricant properties. In this respect, the de-aerating system 108 may include a scavenge pump 148 that pumps air-entrained lubricant from compartment 120 to a lubricant reservoir 150. Before reaching the reservoir 150, the lubricant may optionally pass through a scavenge filter 152 to remove any impurities or contaminants therein. A lubricant cooler 154 may cool the lubricant, which may have been heated from hot bleed air from the turbine 28 or friction from the bearing assembly 118. A de-aerator 156 removes air entrained in the lubricant prior to storage in the reservoir 150. A fresh lubricant pump 158 may pump lubricant from the lubricant reservoir 150 to the compartment 120 as needed to replace lubricant pumped from the compartment 120 by the scavenge pump 148. The lubricant may optionally pass through a supply filter 160 before entering the compartment 120.

FIG. 5 is a flow chart illustrating an exemplary method for sealing a bearing compartment housing and an associated shaft. In step (202), a shaft, such as the high pressure drive shaft 30, is at least partially supported by one or more bearing assemblies 118. Each of the one or more bearing assemblies 118 is at least partially enclosed by the bearing compartment housing 102 in step (204). Next, in step (206), the high pressure drive shaft 30 is rotated about the longitudinal axis 12. As discussed in greater detail above, the high pressure drive shaft 30 generally rotates when the combustion products 60 flow through the turbine 28. A first pressure is created on the outer side 138 of the labyrinth seal 104 and the outer side 142 of the hydrodynamic seal 106 (i.e., in the high pressure cavity 124) in step (208). In one embodiment, this first pressure may be supplied by bleed air from the turbine 28. Then, in step (210), a second pressure is created on the inner side 136 of the labyrinth seal 104 and the inner side 144 of the hydrodynamic seal 106. The first pressure is relatively greater than the second pressure. As such, air flows from the high pressure cavity 124 to the compartment 120, thereby creating an air film between the stationary and rotating components. Steps (208) and (210) may be done in reverse order or simultaneously.

The bearing compartment sealing system 100 is particularly advantageous over known sealing systems. Unlike many contact sealing arrangements, the sealing system 100 is a non-contact sealing arrangement. The reduced friction associated with non-contact sealing results in longer service life, lower maintenance and repair costs, and greater time on wing (TOW) than known contact sealing arrangements. Furthermore, the sealing system 100 requires no dedicated cooling unlike contact seals. The sealing system 100, having one hydrodynamic seal and one labyrinth seal, draws less air into the compartment than sealing arrangements with two labyrinth seals. That is, air flow is greater through a labyrinth seal than a hydrodynamic seal. As such, less heat is pulled into the compartment 120, thereby reducing the load on the gas turbine engine thermal system and permitting a higher temperature limit in the compartment 120. The sealing system 100 is also lighter, less expensive, and smaller than sealing arrangements with two hydrodynamic seals.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A gas turbine engine, comprising:
   a compressor;
   a combustor;
   a turbine;
   a shaft rotatably coupling the compressor and the turbine;
   a bearing positioned between the shaft and one of the compressor or the turbine;
   a housing enclosing the bearing, wherein the housing defines a compartment for holding lubricant therein;
   a remote lubricant reservoir;
   at least one pump for recirculating lubricant between the compartment and the remote lubricant reservoir;
   at least two seals located between the shaft and the housing, wherein the at least two seals, the housing, and the shaft collectively enclose the compartment, and wherein only one of the at least two seals is a hydrodynamic seal further comprising:
   a bleed air port for supplying compressor bleed air to the outer side of the hydrodynamic seal and the pressure on the outer side of a labyrinth seal.

2. The gas turbine engine of claim 1, wherein, during use, an external pressure on an outer side of each of the at least two seals is substantially the same, and wherein, during use, an internal pressure on an inner side of each of at least two seals is substantially the same, and further wherein the external pressure is greater than the internal pressure.

3. The gas turbine engine of claim 1, wherein the shaft includes a hairpin-shaped member proximate to and in sealing engagement with the hydrodynamic seal.

4. The gas turbine engine of claim 1, wherein the at least one pump further comprises a scavenge pump for pumping lubricant from the compartment to the lubricant reservoir and a fresh lubricant pump for pumping lubricant from the lubricant reservoir to the compartment.

5. The gas turbine engine of claim 1, further comprising:
   a de-aerator for removing air from lubricant.

6. The gas turbine engine of claim 1, further comprising:
   a fan section having a plurality of fan blades, wherein the shaft is directly attached to the fan section for rotation thereof.

7. The gas turbine engine of claim 1, further comprising:
   a fan section having a plurality of fan blades; and
   a gearbox, wherein the shaft is attached to the gearbox, and wherein the gearbox rotates the fan section.

8. A method for sealing a bearing compartment in a gas turbine engine, comprising:
   at least partially supporting a shaft having a longitudinal axis with at least one bearing;
   rotating the shaft about the longitudinal axis;
   at least partially enclosing each of the at least one bearing with a housing that defines a compartment for holding lubricant for lubricating the at least one bearing;
   creating a first pressure on an outer side of a hydrodynamic seal and an outer side of a labyrinth seal; and
   creating a second pressure on an inner side of the hydrodynamic seal and an inner side of the labyrinth seal, the first pressure being relatively greater than the second pressure such that air is drawn through the hydrodynamic seal into the compartment wherein creating the first pressure step further comprises creating the first pressure with bleed air from a compressor conduit.

9. The method of claim 8, further comprising:
   pumping lubricant from the compartment with a scavenge pump.

10. The method of claim 9, further comprising:
    removing air from lubricant using a de-aerator.

* * * * *